United States Patent [19]

Hitomi

[11] Patent Number: 5,161,750
[45] Date of Patent: Nov. 10, 1992

[54] FISHING REEL WITH TRANSMISSION SWITCHING MECHANISM

[75] Inventor: Yasuhiro Hitomi, Sakai, Japan
[73] Assignee: Shimano Industrial Co., Ltd., Osaka, Japan
[21] Appl. No.: 621,971
[22] Filed: Dec. 4, 1990

[30] Foreign Application Priority Data

Dec. 5, 1989 [JP] Japan .............................. 1-141386[U]
Dec. 5, 1989 [JP] Japan .............................. 1-141387[U]

[51] Int. Cl.⁵ .............................................. A01K 89/02
[52] U.S. Cl. .................................. 242/295; 242/285
[58] Field of Search ............... 242/295, 302, 285, 263; 74/384

[56] References Cited

U.S. PATENT DOCUMENTS 734,959  7/1903  Rockwell ............................ 242/295
3,989,204 11/1976 Lémery ............................. 242/295
4,899,952  2/1990  Aoki ............................... 242/295 X

FOREIGN PATENT DOCUMENTS 1259592 5/1986 Canada ................................ 242/285
63-119363 8/1988 Japan .

Primary Examiner—Daniel P. Stodola
Assistant Examiner—Tony A. Gayoso
Attorney, Agent, or Firm—Dickstein, Shapiro & Morin

[57] ABSTRACT

A fishing reel is formed of a spool, a drag mechanism, a transmission which transmits rotation of the spool to the drag mechanism, and a one-way transmission mechanism mounted on the transmission for transmitting drive to the drag mechanism only when the spool rotates in a fishing line unwinding direction. The fishing reel also has a transmission switching mechanism capable of establishing a condition in which power transmission between the spool and the drag mechanism is broken.

2 Claims, 6 Drawing Sheets

FISHING REEL WITH TRANSMISSION SWITCHING MECHANISM

BACKGROUND OF THE INVENTION

1. Field of the Invention

The present invention relates to a fishing reel comprising a spool, a drag mechanism, a transmission means for transmitting rotation of the spool to the drag mechanism, and a one-way transmission mechanism mounted on the transmission means for transmitting drive to the drag mechanism only when the spool rotates in a finishing line unwinding direction.

2. DESCRIPTION OF THE PRIOR ART

An example of the fishing reels structured as above is disclosed in Japanese Utility Model Application "Kokai" No. 63-119363, which includes a transmission gear mounted on a rotary shaft of the spool, an intermediate gear constantly meshing with the transmission gear and mounted on an arm oscillatable about an axis of the rotary shaft, and a drag mechanism for meshing the intermediate gear with an input gear when the arm is oscillated to a predetermined position. The one-way transmission mechanism is structured such that only when the spool rotates in the fishing line unwinding direction with a meshing resistance between the transmission gear and the intermediate gear and a rotational resistance of the intermediate gear being increased, the arm is oscillated to the predetermined position under the above-mentioned resistances whereby the drag mechanism exerts a braking force upon the spool.

With this conventional reel, when the spool rotates in the finishing line unwinding direction, the one-way transmission mechanism is operated, as a result of which the braking force is constantly exerted upon the spool. Therefore, if the fishing line is unwound under the self-weight of "a weight", a further operation is required for reducing the braking force of the drag mechanism. Additionally, the braking force of the drag mechanism should be adjusted after the fishing line is unwound under the reduced braking force. This results in not only a troublesome adjusting operation but also the difficulty for a quick unwinding operation of the fishing line.

Furthermore, in order to ensure oscillation of the arm in the conventional reel, it is also required to increase the meshing resistance between the transmission gear and the intermediate gear or the rotational resistance of the intermediate gear. However, these resistances are inherently exerted when the spool rotates in a fishing line winding direction as well. Thus, if these resistances are set to large values, an operational torque for winding up the fishing line becomes disadvantageously large.

SUMMARY OF THE INVENTION

A primary object of the present invention is to realize a fishing reel which can quickly effect a fishing line unwinding operation without reducing a braking force of a drag mechanism.

A secondary object of the present invention is to provide a fishing reel including a one-way transmission mechanism in which a fishing line can be wound up with a small torque.

In order to achieve the primary object, the present invention is characterized in the first place by a fishing reel comprising a spool, a drag mechanism, a transmission means for transmitting rotation of the spool to the drag mechanism, a one-way transmission mechanism mounted on the transmission line for transmitting drive to the drag mechanism only when the spool rotates in a fishing line unwinding direction, and a transmission switching mechanism capable of establishing a condition in which power transmission between the spool and the drag mechanism is broken.

With the first characteristic feature, when the transmission switching mechanism is operated to establish the condition in which power transmission between the spool and the drag mechanism is broken, a braking force of the drag mechanism is not imparted to the spool at all to allow the spool to be freely rotatable. On the contrary, when the transmission switching mechanism is operated to establish power transmission between the spool and the drag mechanism, the braking force of the drag mechanism does not act upon the spool when winding up the fishing line while acting upon the spool when the fish bites to draw the fishing line, under the operation of the one-way transmission mechanism.

Therefore, the spool can unwind the fishing line without damaging a function to automatically switch the operation of the braking force of the drag mechanism only by operating a control lever or the like of the transmission switching mechanism, and the fishing line can be easily unwound without reducing the braking force of the drag mechanism.

Specifically, in the present invention, since the spool can be easily rotated in the fishing line unwinding direction, it can be applied to a bait casting reel for cast fishing or lure fishing.

In order to achieve the secondary object, the present invention is characterized in the second place by a fishing reel wherein the transmission line includes a spool shaft supporting the spool, wherein the one-way transmission mechanism includes a member pivotable about the spool shaft and a spring member disposed around the spool shaft and engageable with the pivotal member, and wherein the spring member is wound around the spool shaft when the spool rotates in the fishing line unwinding direction thereby to allow the pivotal member to follow rotation of the spool shaft.

With this structure, the one-way transmission mechanism is operated when the pivotal member follows the spool shaft through the spring member. Since the spring member is adapted to be wound around the spool shaft to allow the pivotal member to follow rotation of the spool shaft when the spool is rotated in the fishing unwinding direction, the spring member is not wound around the spool when the spool is rotated in a reverse direction, which does not prevent rotation of the spool.

In order to achieve the secondary object, the present invention is characterized in the third place by a fishing reel wherein the transmission means includes the spool shaft supporting the spool, a transmission gear fitted on the spool shaft for torque transmission, an intermediate gear meshing with the transmission gear, and an input gear interlocking with the drag mechanism and meshable with the intermediate gear, wherein the transmission mechanism includes an arm supporting the intermediate gear to be oscillatable about the spool shaft, and means for oscillating the intermediate gear to a position for disengaging from the input gear thereby to be maintainable in the position, and wherein the one-way transmission mechanism includes a one-way friction transmission mechanism for oscillating the arm to a position in which the intermediate gear is meshed with the other gear only when the spool shaft rotates in the fishing line unwinding direction.

With the third characteristic feature, the arm is oscillated by the one-way friction mechanism when the spool shaft rotates in the fishing line unwinding direction thereby to allow the intermediate gear to mesh with the input gear, as a result of which the braking force of the drag mechanism is exerted upon the spool. When the spool shaft is rotated in the reverse direction, the one-way friction transmission mechanism does not act upon rotation of the spool shaft, and thus friction does not prevent rotation of the spool shaft.

As discussed above, the second and third features can provide the fishing reel including the one-way transmission mechanism for winding up the fishing line with a small torque.

Other objects, features and advantages of the present invention will be apparent from the following description referring to the accompanying drawings.

BRIEF DESCRIPTION OF THE DRAWINGS

FIGS. 1 through 4 show a first embodiment of the present invention in which:

FIG. 1 is a plan view in section of a fishing reel of the present invention;

FIG. 2 shows a condition in which a transmission switching mechanism is set to an "ON" position;

FIG. 3 shows a condition in which the transmission switching mechanism is set to an "OFF" position; and FIG. 4 is an exploded perspective view of a transmission gear and the like;

FIGS. 5 through 9 show a second embodiment of the present invention in which:

FIG. 5 is a plan view in section of a fishing reel of the present invention;

FIG. 6 shows a position of an arm when a spool rotates in a winding direction;

FIG. 7 shows a position of the arm when the spool rotates in an unwinding direction;

FIG. 8 shows a position of an engaging piece when a drag mechanism is set to a non-operational condition; and FIG. 9 is an exploded perspective view showing the arm, a one-way friction mechanism and the like.

DESCRIPTION OF THE PREFERRED EMBODIMENTS

A first embodiment according to the present invention will be described below referring to the accompanying drawing.

Figure 1:
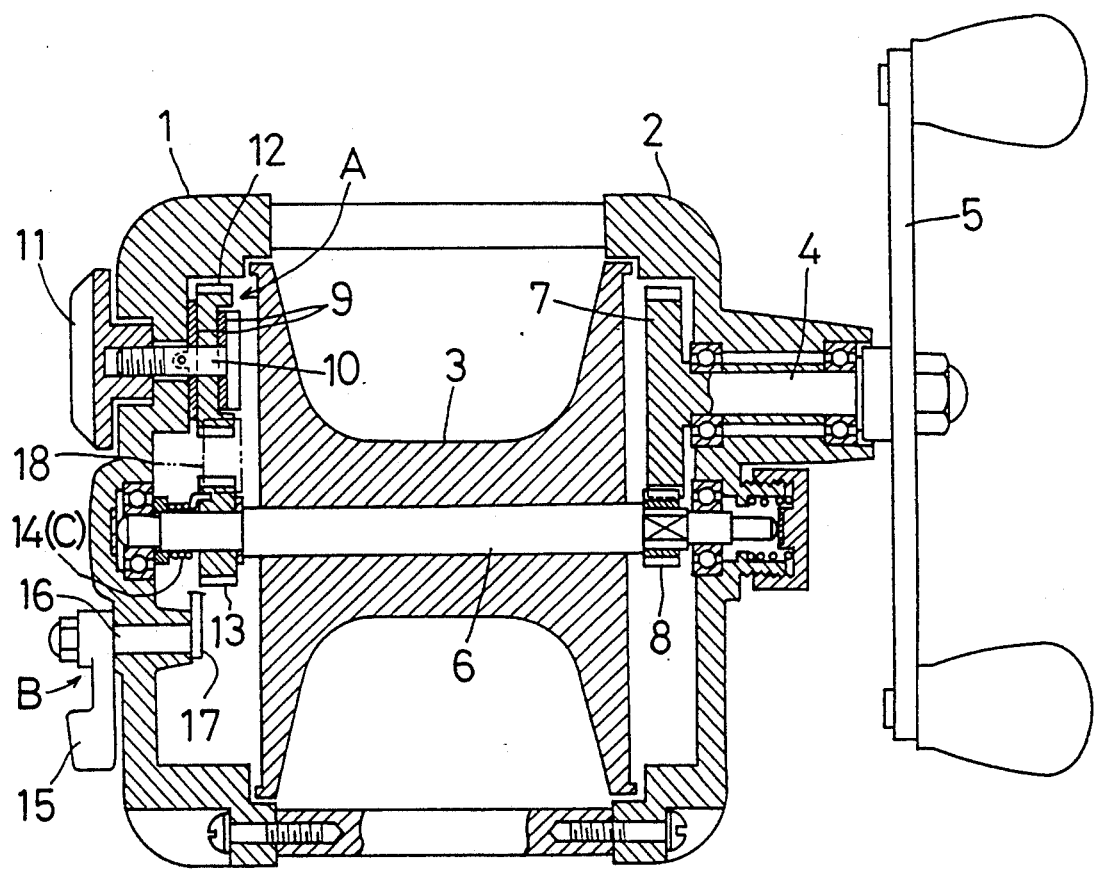

FIG. 1 shows a fishing reel comprising a right and left cases 1 and 2, a spool 3 disposed between the right and left cases for winding up a fishing line, a handle 5 mounted on the right side case 2 through a control shaft 4, a rotary shaft 6 rotatable in unison with the spool 3, a pair of gears 7 and 8 mounted inside the right side case 2 for transmitting a rotational force from the control shaft 4 to the rotary shaft 6, and a drag mechanism A mounted on the left side case 1.

Figure 4:
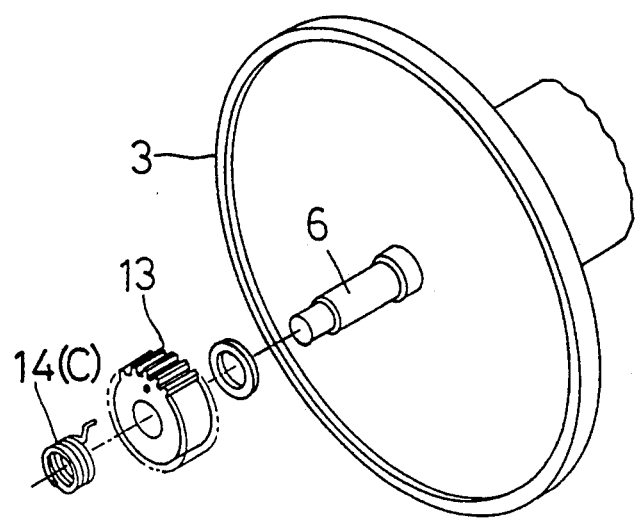
Figure 2:
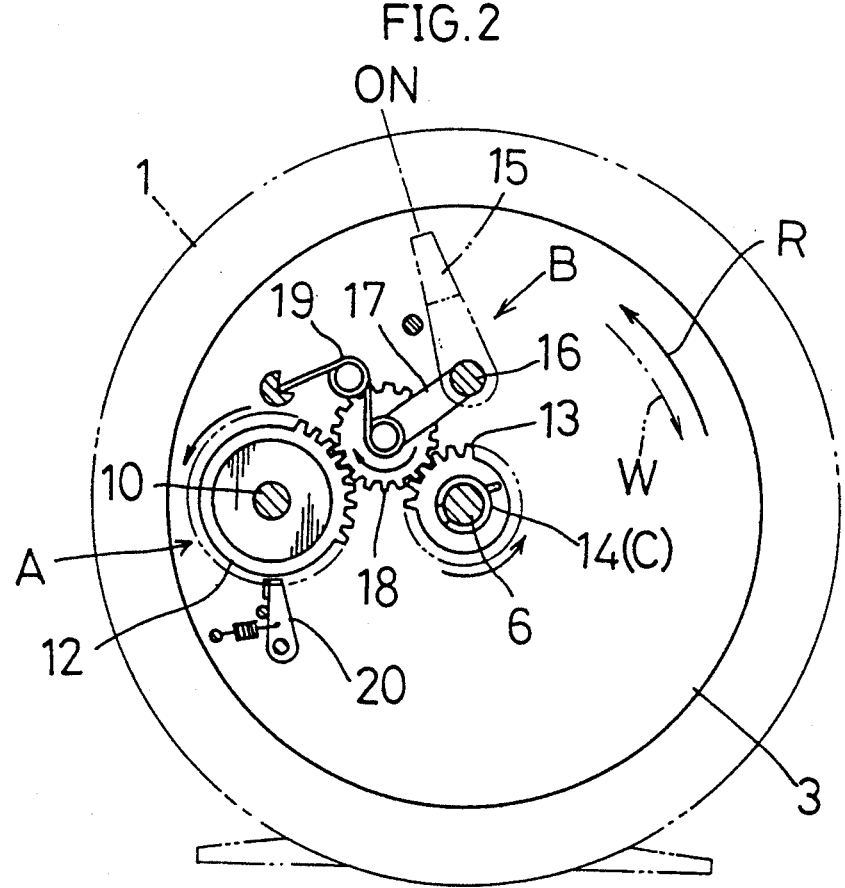
Figure 3:
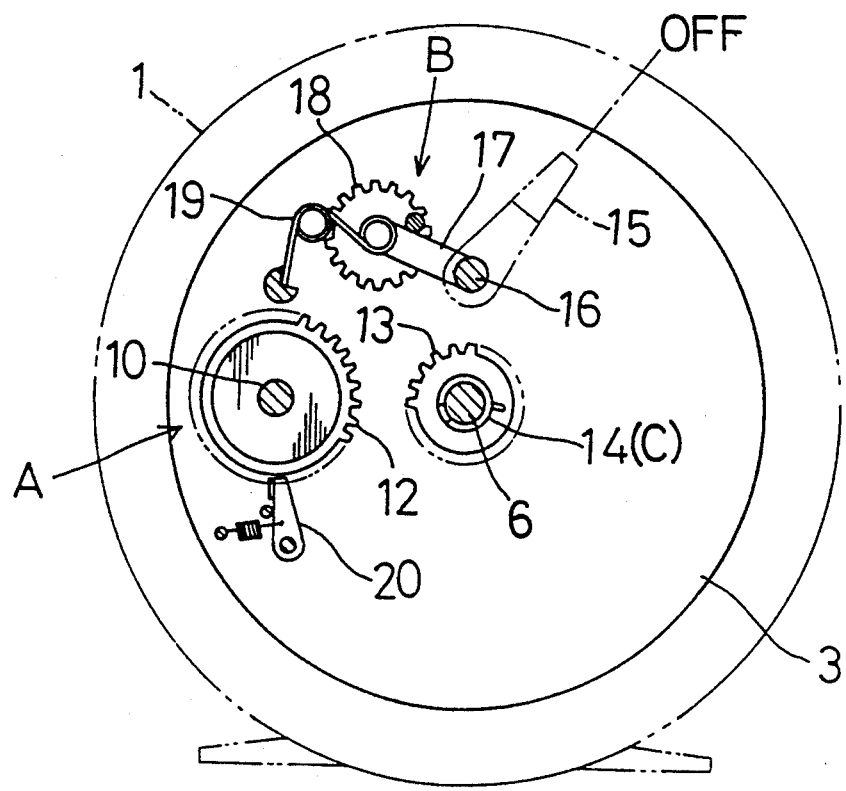

As shown in FIGS. 2 through 4, the drag mechanism A includes two friction plates 9, a screw 10 for adjusting a friction force, an adjusting dial 11, and an input gear 12 held between the two friction plates 9. A transmission gear 13 is loosely fitted on the rotary shaft 6, and as one-way transmission mechanism C including a spring member 14 is disposed between the rotary shaft 6 and the transmission gear 13.

The left case 1 connects an arm 17 through a control lever 15 and a support shaft 16, which arm supports an intermediate gear 18 and receives an urging force of a toggle spring 19. When the control lever 15 is set to an "ON" position as shown in FIG. 2, the transmission gear 13, the intermediate gear 18, and the input gear 12 are meshed with each other. As a result, when the rotary shaft 6 rotates in a fishing line unwinding direction R, the one-way transmission mechanism C establishes a power transmission condition, whereby the drag mechanism A exerts a braking force upon the spool 3. On the other hand, when the rotary shaft 6 rotates in a fishing line winding direction W, the one-way transmission mechanism C is in a non-transmission condition, whereby the spool 3 does not receive the braking force of the drag mechanism A.

As shown in FIG. 3, when the control lever 15 is set to an "OFF" position, the intermediate gear 18 is disengaged from the transmission gear 13 and the input gear 12, respectively, as a result of which the braking force of the drag mechanism A does not act upon the spool 3 when the spool 3 is rotated in either direction.

The combination of the control lever 15, the support shaft 16, the arm 17 and the intermediate gear 18 is referred as a transmission switching mechanism B.

With the present reel, a click noise producing plate 20 is engaged with the input gear 12.

A second embodiment according to the present invention will be set forth next referring FIGS. 5 through 9.

Figure 5:
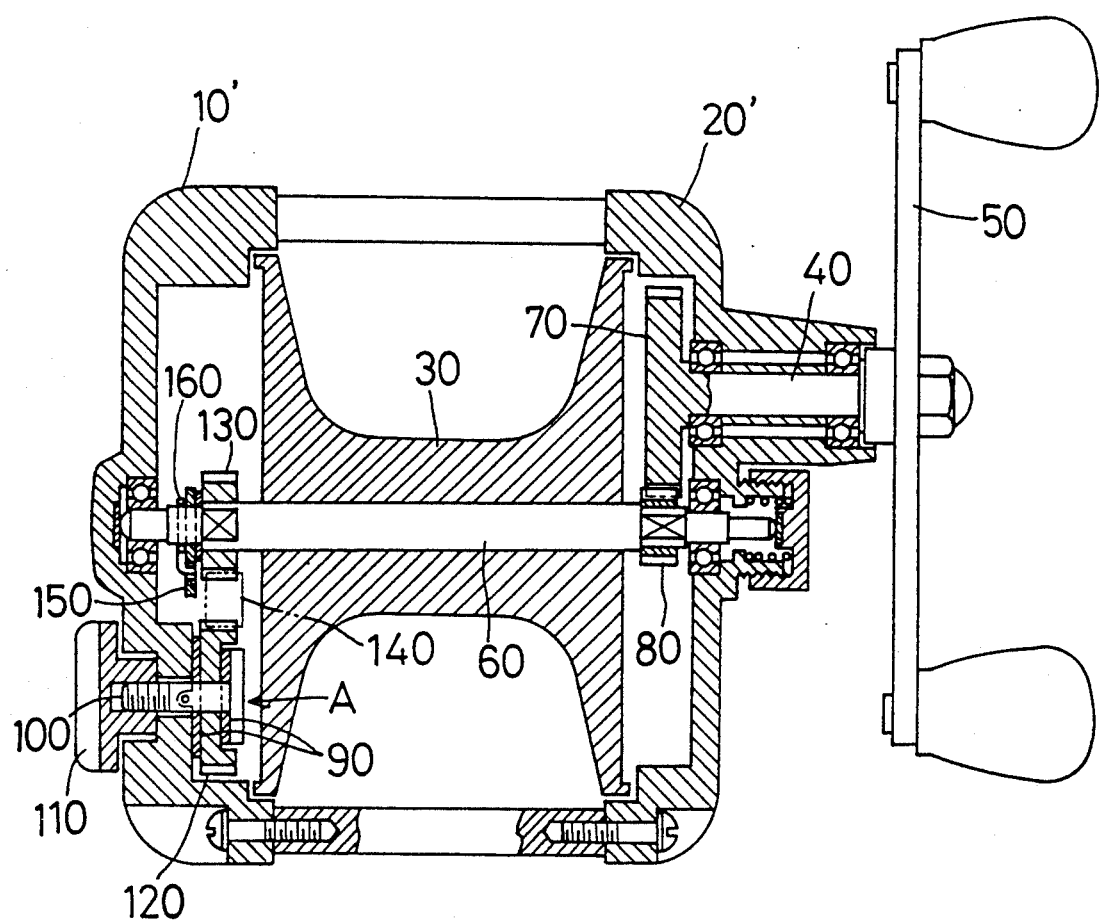

FIG. 5 shows a fishing reel comprising a right and a left cases 10' and 20', a spool 30 disposed between the right and left cases for winding up a fishing line, a handle 50 mounted on the right case 20' through a control shaft 40, a rotary shaft 60 rotatable in unison with the spool 30, a pair of gears 70 and 80 mounted inside the right side case 20' for transmitting a rotational force from the control shaft 40 to the rotary shaft 60, and a drag mechanism A mounted on the left side case 10'.

As shown in FIGS. 6 through 9, the drag mechanism A includes two friction plates 90, a screw 100 for adjusting a friction force, an adjusting dial 110, and an input gear 120 held between the two friction plates 90. A transmission gear 130 is fixed to the rotary shaft 60. An arm 150 rotatably supporting an intermediate gear 140 meshed with the transmission gear 130 is freely rotatably supported by the rotary shaft 60. A one-way friction mechanism 160 comprising a spring member is disposed between the arm 150 and the rotary shaft 60. The one-way friction mechanism 160 oscillates the arm 150 up to a position shown in FIG. 7 only when the rotary shaft 60 rotates in the fishing line unwinding direction R to mesh the intermediate gear 140 with the input gear 120, whereby the spool 30 receives a braking force from the drag mechanism A. That is, with the second embodiment, a one-way tranmission mechanism C comprises the arm 150, the one-way friction mechanism 160 and the like.

Figure 6:
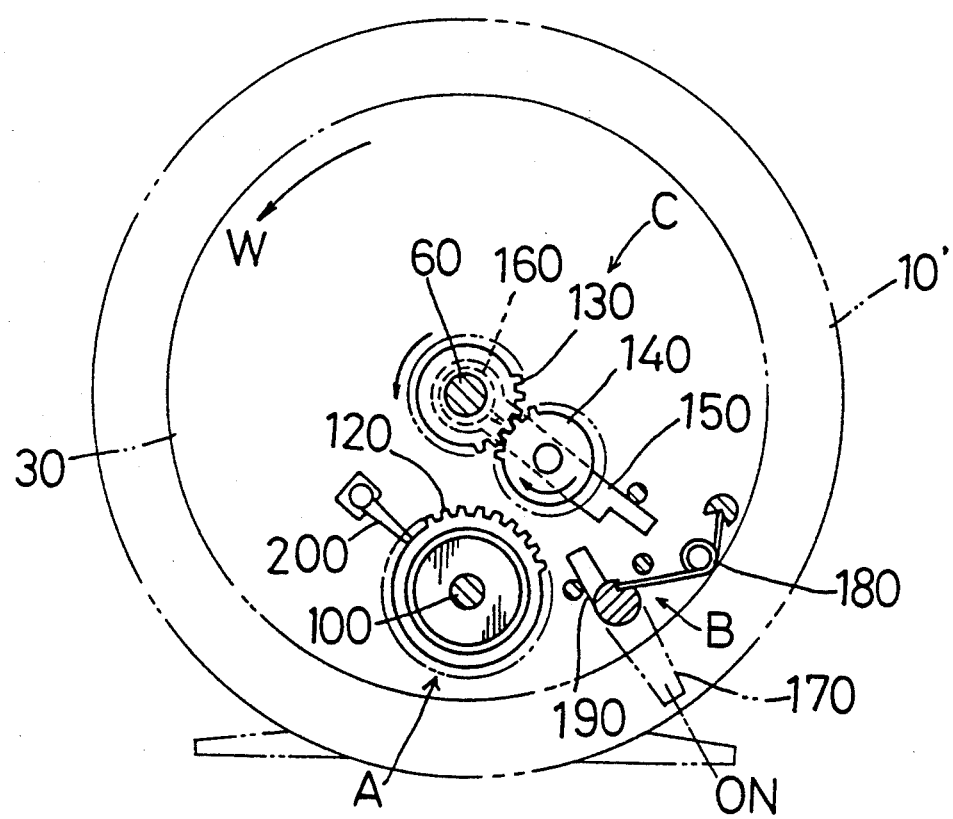
Figure 7:
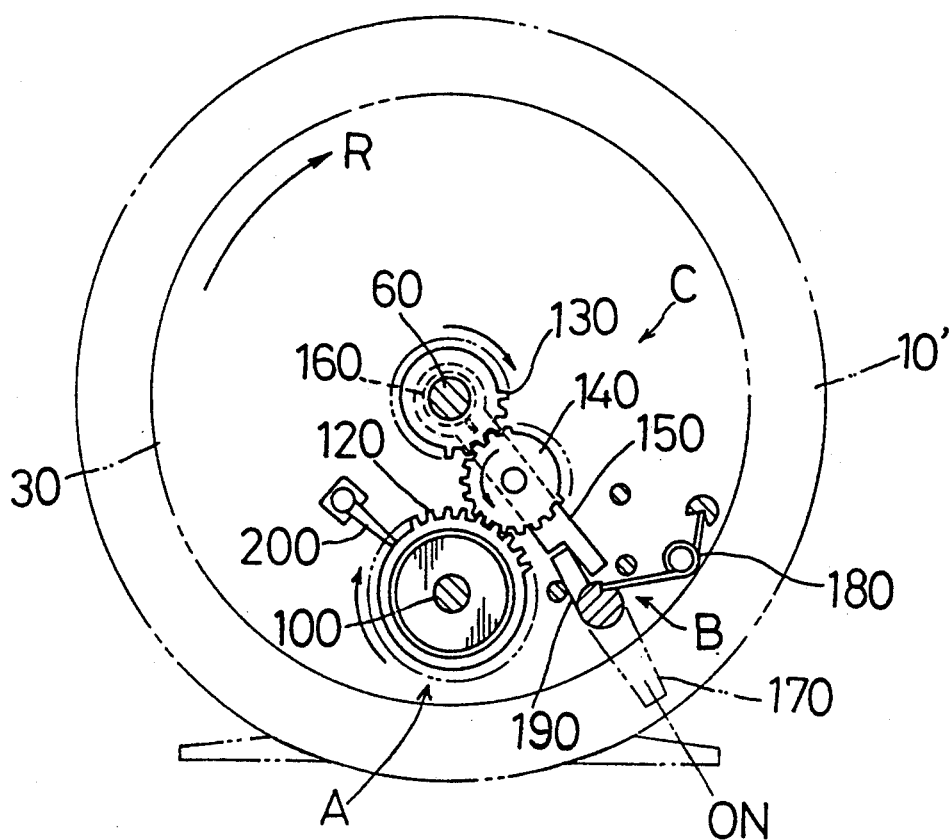
Figure 8:
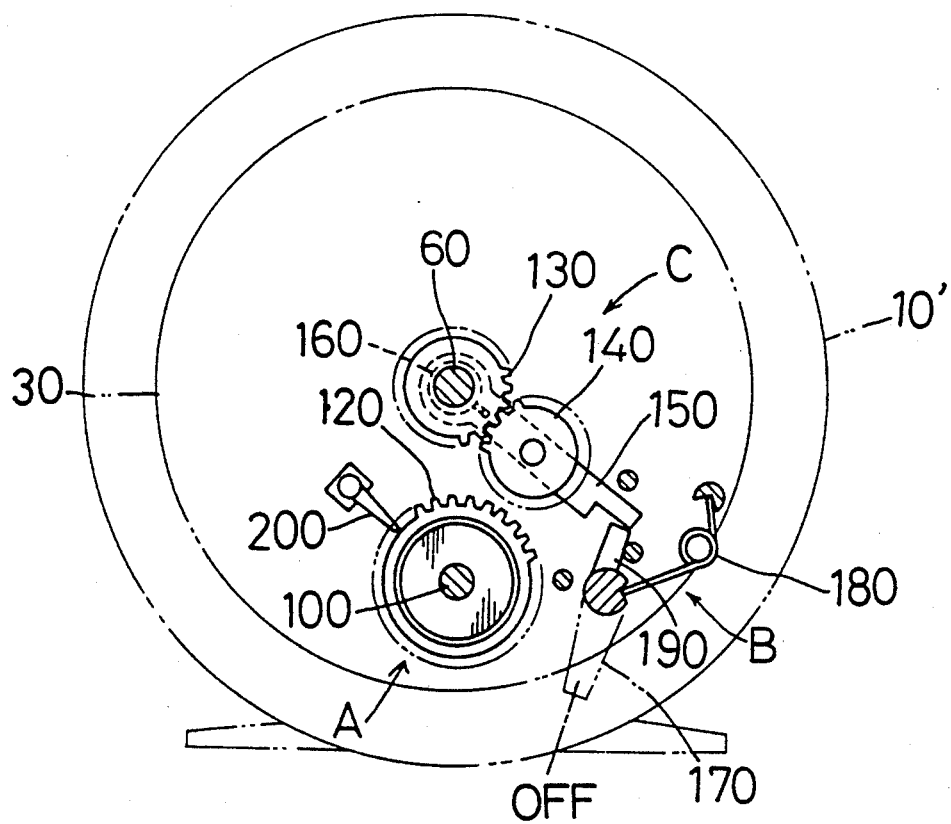
Figure 9:
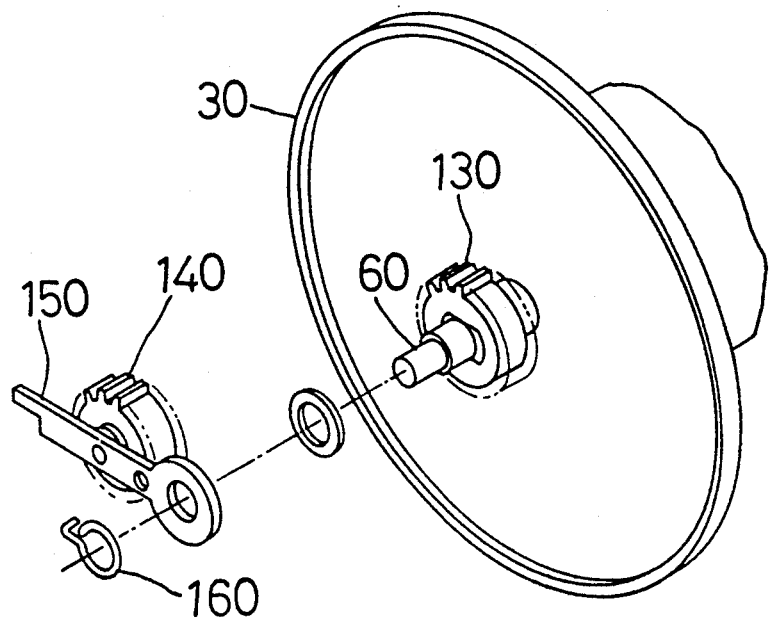

The one-way friction mechanism 160, as far as the rotary shaft 60 continues to rotate in the fishing line unwinding direction R, permits rotation of the rotary shaft while exerting an oscillating force upon the arm 150. When the spool 30 is rotated in the fishing line winding direction W by operating the handle 50, transmission of the oscillating force to the arm 150 is broken thereby to allow the intermediate gear 140 to oscillate in a direction away from the input gear 120 as shown in FIG. 6.

Inside the left side case 10' is mounted an engaging piece 190 swung by the control lever 170 and switchable between an "ON" position and an "OFF" position under an urging force of a toggle spring 180. The transmission switching mechanism B is structured as follows: When the engaging piece 190 is set to the "ON" position, the drag mechanism A automatically effects a switching operation, as noted above, and when the engaging piece 190 is set to the "OFF" position, the drag mechanism A does not exert the braking force upon the spool 30.

A click noise producing plate 200 is engaged with the input gear 120 of the drag mechanism A.

Further embodiments will be described hereinafter. Like members have the like reference numbers and symbols.

Figure 10:
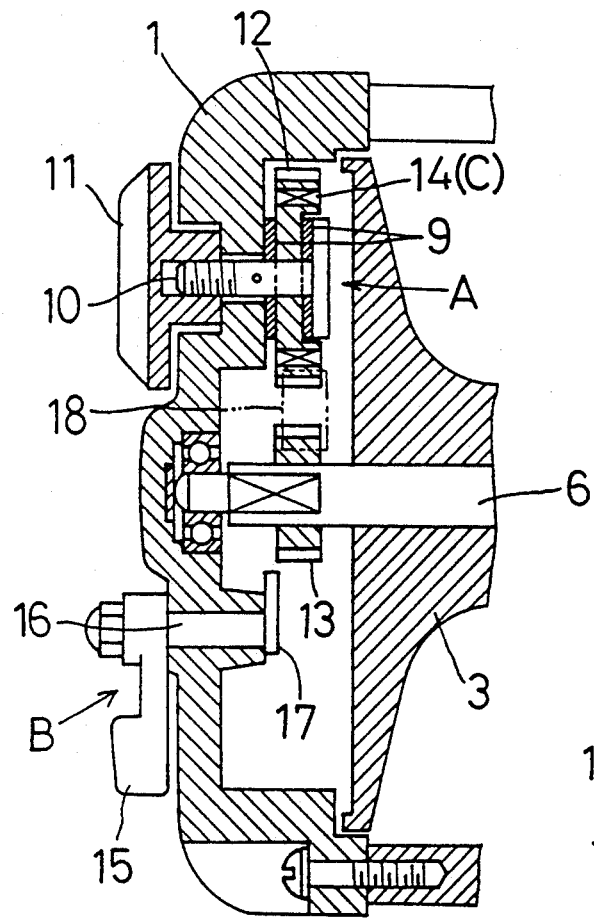
FIGS. 10 and 11 are fragmentary sectional views showing transmission means in a third and a fourth embodiments, respectively.

As seen from FIG. 10, the present invention may be practiced by fixing the transmission gear 13 to the rotary shaft 6, by interposing a one-way clutch type one-way transmission mechanism 14 between the input gear 12 and a braking line of the drag mechanism A, and further by providing the intermediate gear 18 through the foregoing structure.

Figure 11:
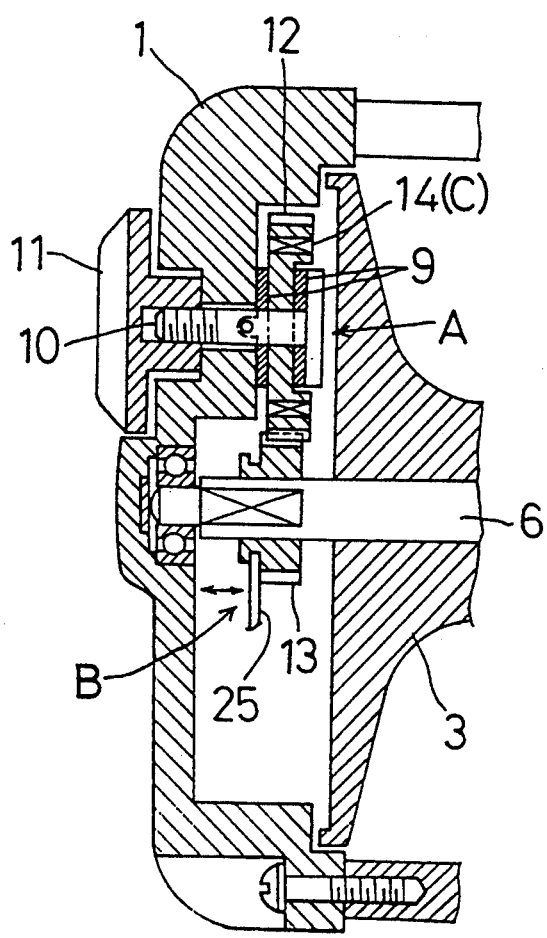

The present invention may be also practiced, as shown in FIG. 11, by fitting the transmission gear 13 on the rotary shaft 6 to be shiftably operated for torque transmission, by meshing the transmission gear 13 with the input gear 12 of the drag mechanism A, by interposing the one-way clutch type one-way transmission mechanism 14 between the input gear 12 and the braking line, and further by providing a shifter 25 for shifting the transmission gear 13 thereby to selectively mesh the transmission gear 13 with the input gear 12.

Alternatively, the one-way transmission mechanism may include a ratchet wheel and a ratchet pawl. The transmission switching mechanism may be formed by an operational line for moving the ratchet pawl to a position for disengaging from the ratchet wheel. Also, the one-way transmission mechanism may include a roller bearing to work the present invention in various ways.

The one-way friction mechanism may comprise a mechanism for transmitting the rotational force under the friction force which is serially arranged with a one-way clutch. In addition, the present invention may be applied to a single bearing reel.

The one-way friction mechanism may be also formed by serially arranging the one-way clutch and the click noise producing mechanism. With this structure, the arm is oscillated under the friction braking force of the click noise producing mechanism, and a click noise may be generated only when the spool unwinds the fishing line.

The one-way transmission mechanism and the one-way friction mechanism include such a structure as the friction force is increased or reduced depending on a rotational direction of the rotary shaft.

What is claimed is:

1. A fishing reel comprising:
   a rotatable spool shaft;
   a spool mounted on said spool shaft for taking up a fishing line;
   a drag mechanism;
   transmission means for establishing power transmission between said spool shaft and said drag mechanism, said transmission means including a first transmission gear associated with said spool shaft and a second transmission gear associated with said drag mechanism;
   a one-way transmission mechanism mounted on said transmission means for transmitting rotation of said spool to said drag mechanism only when said spool rotates in a fishing line unwinding direction;
   an intermediate gear displaceable between an engaged position which permits power transmission between said first and second transmission gears, and a disengaged position which prohibits power transmission between said first and second transmission gears;
   a pivot arm pivotable about said spool shaft and supporting said intermediate gear; and
   spring transmission means connected at one end thereof to said pivot arm and at least partially wound around said spool shaft, said spring transmission means transmitting rotational displacement of said spool shaft in the fishing line unwinding direction to thereby move said pivot arm in an engaging direction such that said intermediate gear is displaced toward its engaged position.

2. A fishing reel as claimed in claim 1 further comprising a changeover control member displaceably operable between a first position which prevents said pivot arm from moving in the engaging direction and a second position which permits said pivot arm to move in the engaging direction.

* * * * *